April 21, 1936.     E. G. RIDER     2,038,129

BOX FORMING SYSTEM

Original Filed May 18, 1932    9 Sheets-Sheet 1

Fig. 1.

INVENTOR.
Ernest G. Rider
BY
Cornelius D. Ehret
his ATTORNEY.

Fig. 2.

April 21, 1936.      E. G. RIDER      2,038,129
BOX FORMING SYSTEM
Original Filed May 18, 1932    9 Sheets-Sheet 4

INVENTOR.
Ernest G. Rider
BY
Cornelius D. Ehret
his ATTORNEY.

April 21, 1936.  E. G. RIDER  2,038,129

BOX FORMING SYSTEM

Original Filed May 18, 1932  9 Sheets-Sheet 5

INVENTOR.
Ernest G. Rider

BY
Cornelius D. Ehret
his ATTORNEY.

April 21, 1936.　　　　　E. G. RIDER　　　　　2,038,129
BOX FORMING SYSTEM
Original Filed May 18, 1932　　9 Sheets-Sheet 6

April 21, 1936.　　　　E. G. RIDER　　　　2,038,129
BOX FORMING SYSTEM
Original Filed May 18, 1932　　9 Sheets-Sheet 7

April 21, 1936.  E. G. RIDER  2,038,129
BOX FORMING SYSTEM
Original Filed May 18, 1932   9 Sheets-Sheet 9

Fig.16.

INVENTOR.
Ernest G. Rider
BY
Cornelius D. Ehret
his ATTORNEY.

Patented Apr. 21, 1936

2,038,129

UNITED STATES PATENT OFFICE 2,038,129

BOX-FORMING SYSTEM

Ernest G. Rider, Philadelphia, Pa., assignor to Stokes and Smith Company, Philadelphia, Pa., a corporation of Pennsylvania Application May 18, 1932, Serial No. 611,995
Renewed February 21, 1935

33 Claims. (Cl. 93—43)

My invention relates to box-forming or box-wrapping systems for applying sheet material, as wrappers, labels, or the like, to box structure to form boxes, containers, box covers, or the like, generically termed boxes.

In accordance with my invention, the box blank, or box component, while gripped or held by mechanism for transferring it to the form block of a box machine, for example, is automatically moved from a position of approximate alignment with the form block to a position of exact alignment therewith.

In some forms of my apparatus, the box is gripped mechanically by clamping members which are electro-mechanically or mechanically opened to allow a box blank to be positioned between relatively movable clamping members, while in another modification, the box structure is held by suction during its automatic alignment and transfer.

Further in accordance with my invention, the unapplied panels of a wrapper, or equivalent, partially applied to the box, are, during transport of the box and wrapper assembly toward the form block, floated upon an air-cushion provided by blasts of air.

My invention further resides in the novel features of combination, construction, and arrangement hereinafter described and claimed.

For an understanding of my invention, and for illustration of several forms thereof, reference is made to the accompanying drawings, in which.

Figure 1:
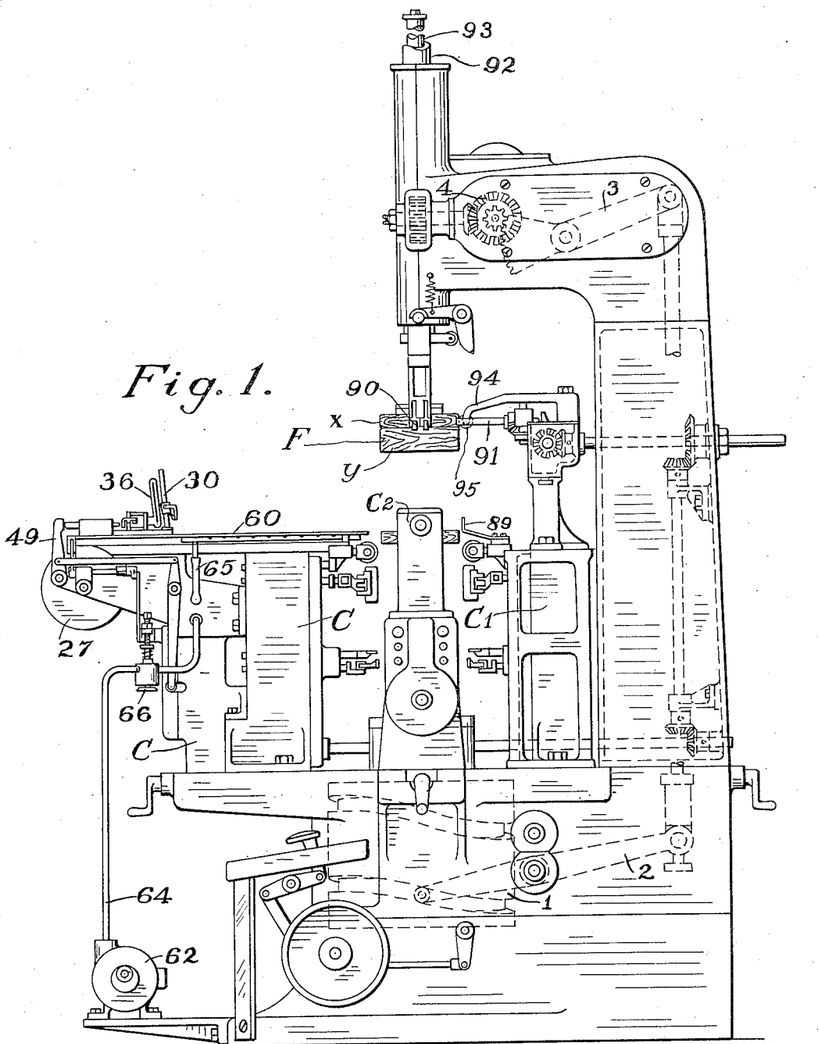
Fig. 1 is a side elevational view of a box wrapping or forming machine utilizing the invention.

The box machine shown in Fig. 1 is generally of the type shown in Federwitz et al., Patent No. 1,541,036, and more particularly to the machine shown in Federwitz application, Serial No. 522,739, filed March 6, 1931.

Briefly, the form-block F having sections $x$, $y$ is reciprocated by motion transmitted from the cam 1 by the levers 2, 3, and gear train 4. As the form block moves downwardly, the various wrapping tools of the slides C—C4 apply a wrapper or form a box in the known manner.

This invention is particularly concerned with feeding of a box, box blank, box component, or the like, into the path of the form block, generally as described and claimed in co-pending applications Serial No. 490,400, filed October 22, 1930, and Serial No. 460,859, filed June 13, 1930.

Figure 2:
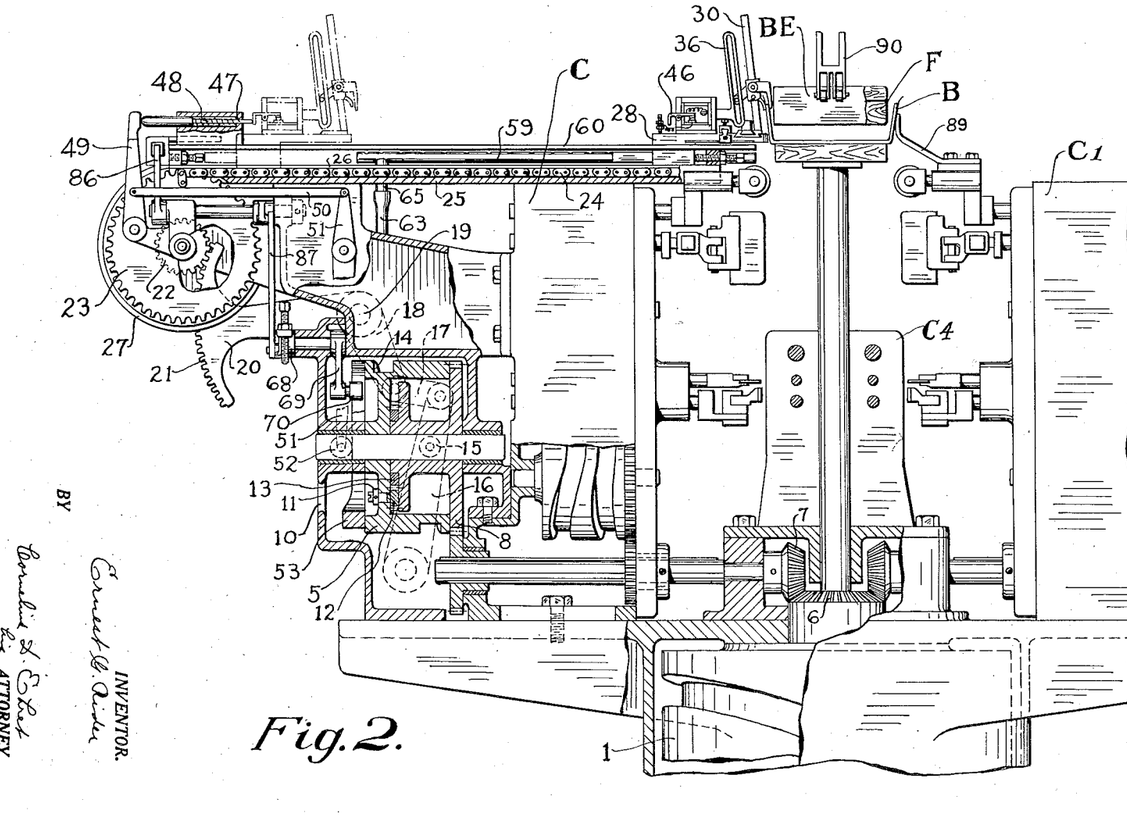
Fig. 2 is a side elevational view, on enlarged scale, with parts in section, and parts broken away, of transfer mechanism shown in Fig. 1.

Referring to Fig. 2, the cam 5 disposed within the front slide C, is driven from the main cam 1 in timed relation to reciprocations of the form block F by the train of gears 6 to 8. Preferably, as shown, the cam 5 can be angularly adjusted with respect to gear 8 to time the mechanism subsequently described for different size boxes. Specifically, the clamping bolts 9, 9, Fig. 9, may be loosened to release the driving engagement between these members; a suitable tool is then inserted through the opening 10 in the front of the casing, Fig. 2, into engagement with the rotatable stud 11, which carries a pinion 12, Fig. 9, engaging a gear 13 secured to the hub of gear 8. Rotation of the pinion changes the relative positions of cam 5 and gear 8. When the desired position is obtained, the bolts 9 are tightened to hold these parts in their adjusted position.

Figures 9, 10:
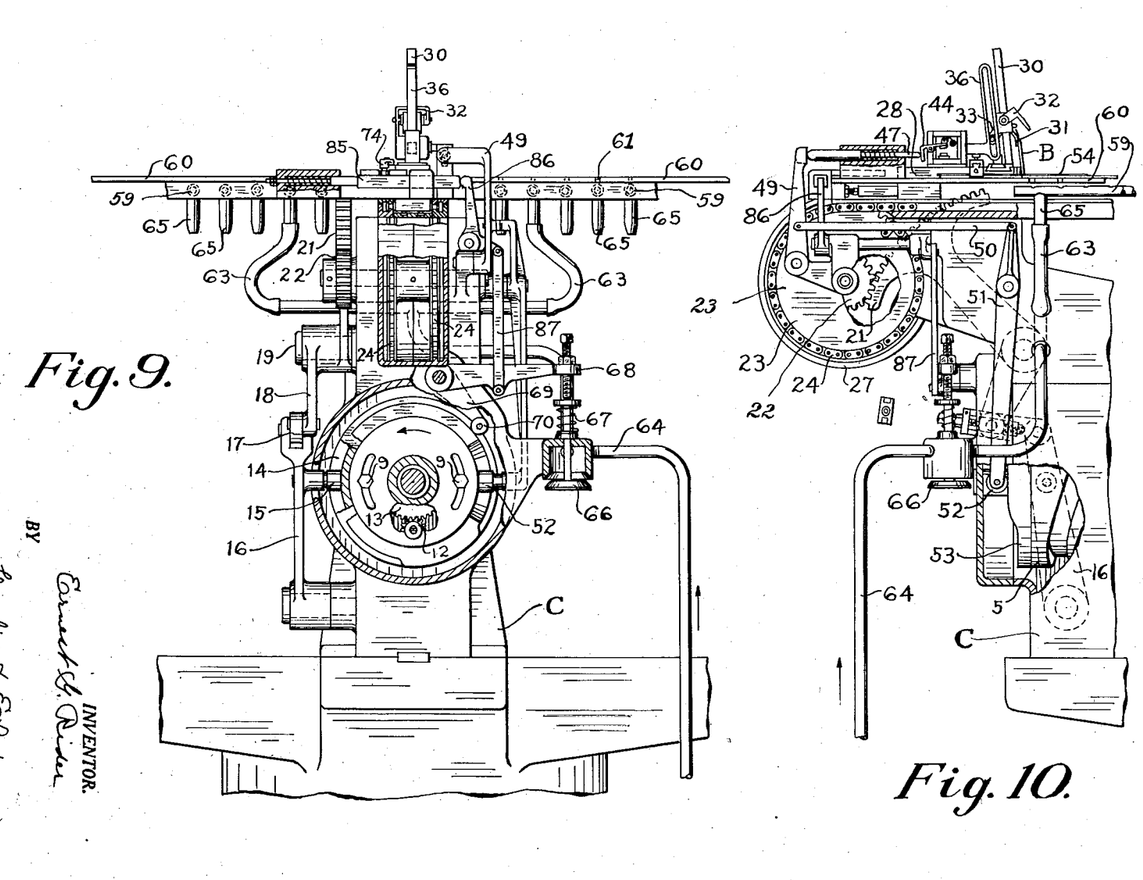
Fig. 9 is a front elevational view, parts in section, and parts broken away, of mechanism shown in Figs. 1 and 2.
Fig. 10 is a side elevation, with parts in section, of Fig. 9.
Figure 11:
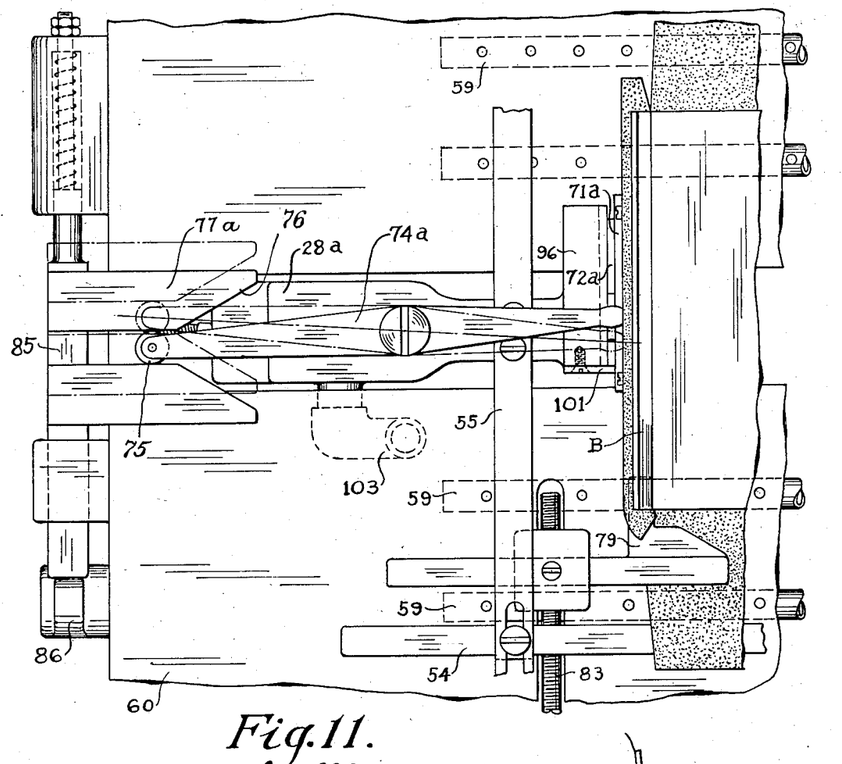
Figs. 11 and 12 are top plan and side elevational views respectively of a modified form of transfer carriage.
Figure 12:
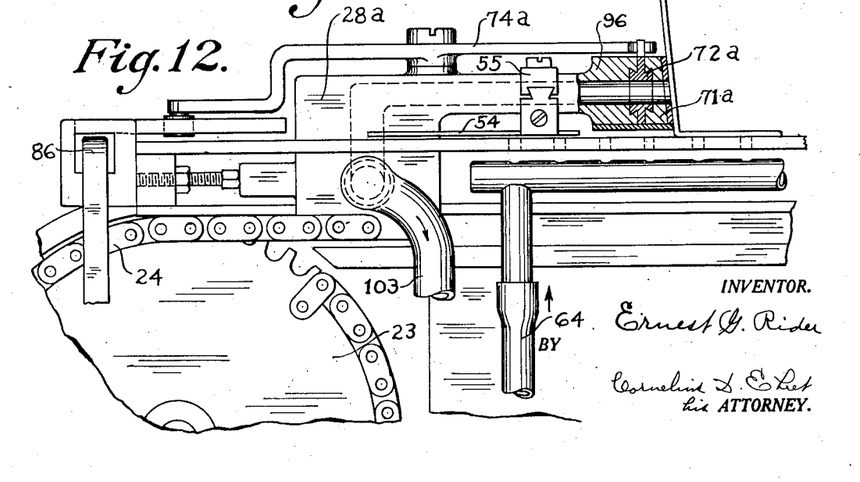
Figure 13:
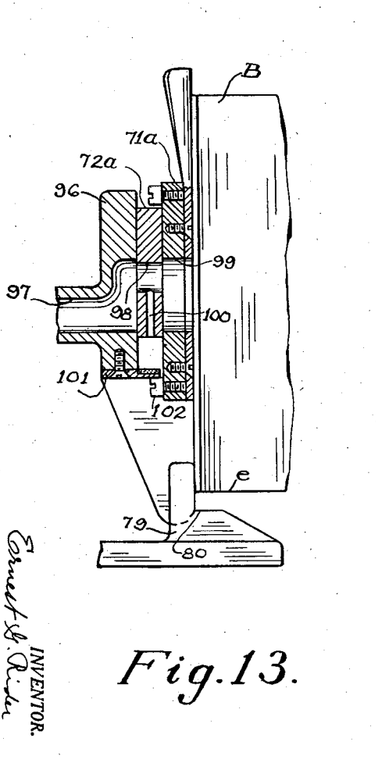
Figs. 13, 14, and 15 are detail views illustrating the relative positions of parts shown in Figs. 11 and 12 for various stages of box aligning movement.
Figure 14:
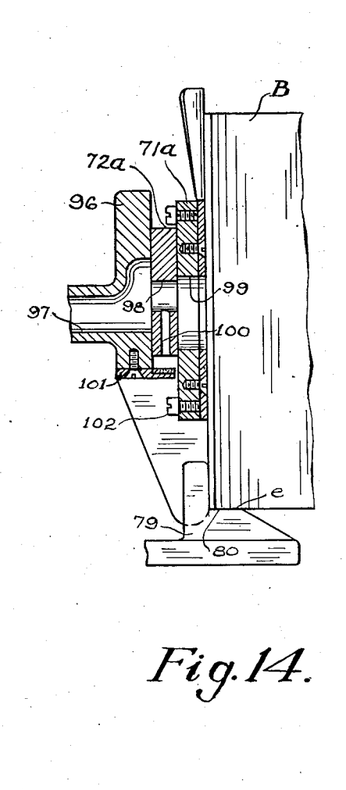
Figure 15:
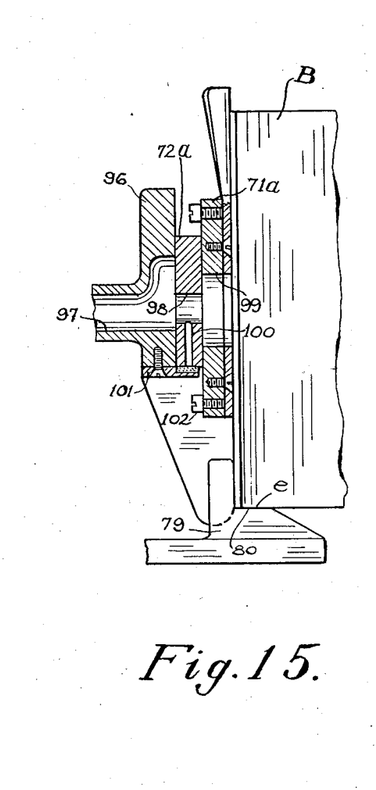

The groove 14 of the cam, Figs. 2 and 9, is engaged by the follower 15 carried by arm 16 pivotally mounted at its lower end upon slide C. The upper end of the arm is connected by link 17 to one arm 18 of a bell-crank lever pivotally mounted at 19 upon the casing C, the other arm 20 of the bell crank terminating in a gear segment 21 which drives the gear 22 movable with sprocket 23. As the gear segment 21 rotates in a counter-clockwise direction from the position shown in Fig. 10, the chain 24 which engages the teeth of the sprocket, and has one end fastened thereto, is pushed between the guides 25, 26 towards the path of movement of the form block, and is returned, upon reverse movement of the sprocket. The guard 27 for the sprocket is in effect a continuation of the guides 25, 26 and prevents buckling of the chain, so that it is to all intents a rigid driving member between the sprocket and the carriage 28 which is reciprocated by oscillation of the gear segment 21 between the box-receiving position shown in dotted line in Fig. 2, to the box-delivering position adjacent the form block, Fig. 2, in timed relation to movement of the form block.

The member 29 adjustably clamped to the bar 30 extending upwardly from carriage 28, has a fixed clamping member 31 and a relatively movable clamping member 32. These members are adapted to engage and hold the side wall of a box, unstayed box, box component, etc. The actuating arm 33 for the movable clamping member 32, as shown most clearly in Figs. 6 and 7, terminates in a pin 34 extending at right-angles thereto, into the slot 35 of reciprocating member 36. As member 36 is moved to the right from the position shown, the jaws 31, 32 are opened, and vice versa. Preferably as shown, the slot 35 of member 36 extends substantially parallel to member 30, so that for all positions of adjustment of the clamping unit 29 to accommodate different sizes of boxes, the proper relative positions of pin 34 and slot 35 are maintained.

Figures 6, 7, 8:
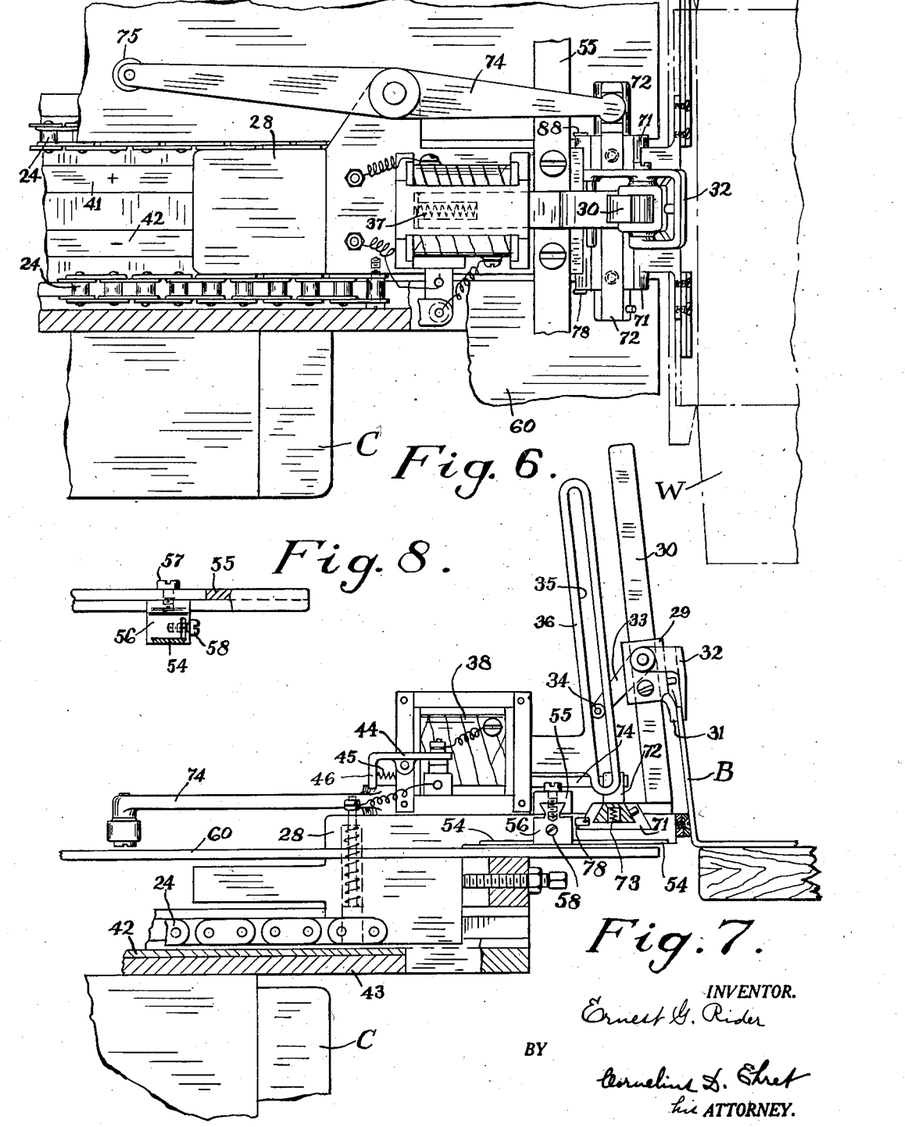
Figs. 6 and 7 in top elevation, and side section respectively, illustrate the carriage of Fig. 4, at box-delivering position.
Fig. 8 is a detail view of sheet supporting means.

The spring 37, Fig. 6, constantly biases the member 36 to jaw-opening position, but the solenoid 38 when energized overcomes the force of spring 37 and retains the parts in the position shown in Fig. 7. The brushes 39, 40 movable with carriage 28 conduct current from the rails 41, 42, carried by the insert 43 of insulation which extends from the box receiving position to the box discharging position. Current is therefore continuously supplied to the solenoid to retain the jaws 31, 32 closed, except as now described.

In series with one of the brushes and the solenoid, is a switch 44 biased to closed position by spring 45. When the carriage 28 is at the box-receiving position, shown in dotted line in Fig. 2, the tail 46 of the movable switch member is in the path of plunger 47, normally held in the position shown in Fig. 2, by the spring 48. At proper time, in the cycle of operation of the machine, and for a suitable interval, plunger 47 is forced to the right by arm 49 to hold the switch 44 open to break the solenoid circuit, whereupon the spring 37 is effective to open the jaws 31, 32 to receive a box.

Specifically, the arm 49 is connected by link 50 to the upper end of an arm 51 whose lower end carries a cam follower 52 engaging the cam 53 rotatable with cam 5. The timing of the cams is such that with the carriage at the box-receiving station, jaws 31, 32 open to receive a box, and are closed to clamp a box before cam 5 initiates movement of carriage 28 towards the form block. The circuit of the solenoid remains closed, until the carriage 28 returns to the box-receiving position. It is not necessary with the construction shown, to de-energize a solenoid to open the jaws at the box delivering position, for the downward movement of the form block pulls the box from the jaws which do not hold it so tightly as to cause damage by this mode of box release.

Figure 3:
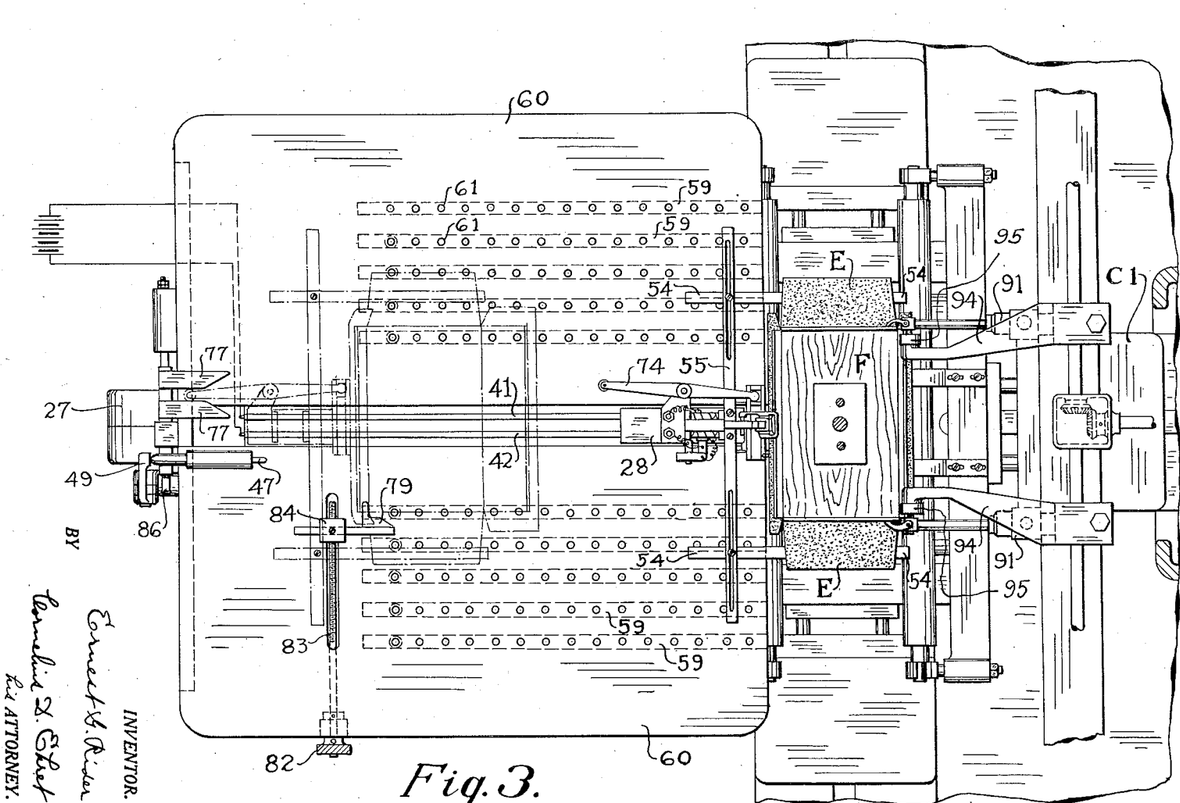
Fig. 3 is a top plan view of parts shown in Fig. 2.
Figures 4, 5:
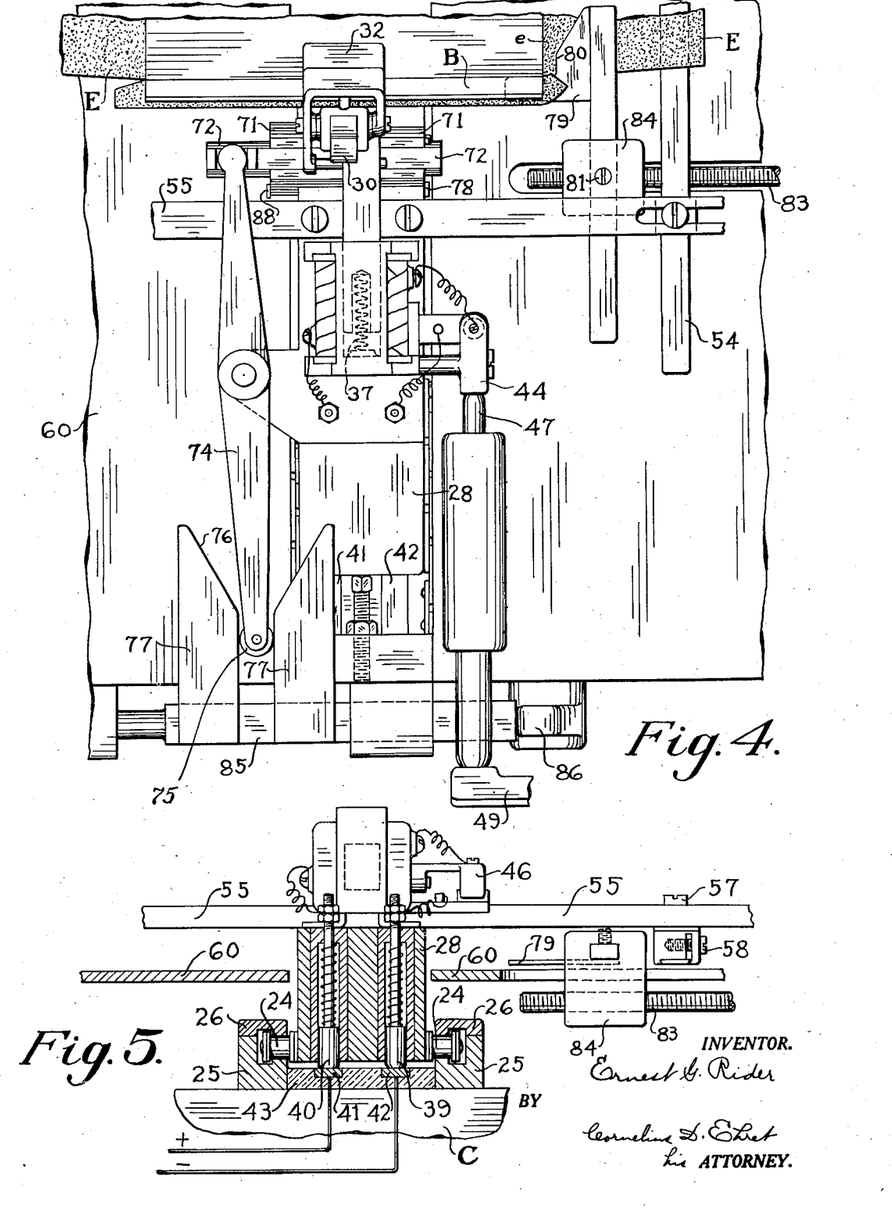
Fig. 4 is a detail view, top plan, on enlarged scale, of the transfer carriage at box-receiving position.
Fig. 5 is a front elevational view, in section, of parts shown in Fig. 4.

While the mechanism thus far described can be used to transfer boxes or box blanks to the form block, it is particularly adapted to be used for transferring a box or box-blank, to which sheet material, as a wrapper W, has been partially applied. Preferably as shown in Figs. 3 and 4, the unapplied, projecting portions E of the wrapper are supported by the bars 54, which project in advance of carriage 28 to prevent them from catching in any part of the mechanism. To accommodate different sizes of wrappers, these bars are each adjustably secured to a slotted cross member 55 fastened to carriage 28. As shown most clearly in Fig. 8, the supporting block 56 for each of the bars is adjustably clamped to slotted member 55 as by screw 57, while the bar 54 may be adjusted parallel to the path of movement of carriage 28 by releasing the screw 58 which clamps it to block 56.

Preferably during the movement of the assembly comprising a box, or box component, and partially applied wrapper, the unapplied portions, as the end panels E are floated upon a cushion of air provided by an air blast, the bars 54 having simply the function of holding up the end panels when the box is actually under the form block.

As shown most clearly in Figs. 3, 9 and 10, a plurality of tubes 59 extend beneath the table 60 parallel to the path of movement of carriage 28, each in communication with a series of holes 61. The pump or blower 62 for supplying the blast may be placed in communication with any pair of the tubes 59 by the flexible hoses 63, each having one end in communication with a branch of the pipe 64 from the pump, and whose other end may be slipped over any one of the nipples 65 of the pipes 59. The blast is preferably shut off when the carriage is at the box-receiving position. To that end, the valve 66, normally biased to closed position by spring 67, is opened by movement of arm 68 operated by lever 69 carrying a cam follower 70 engaging with periphery of cam 53.

With the transfer arrangements shown in my aforesaid applications, it was necessary for the operator accurately to align the box at the box receiving station, with the form block. In the present arrangement, provision is made for performing this operation automatically, that is, the operator need only place the box, box blank or equivalent, in rough or approximate alignment with the form block, and mechanism moves the box to precise alignment. Though the amount of movement necessary to bring the box to this position will vary, the mechanism now described moves the box from whatever its position of rough alignment may be, within reasonable limits, to the proper extent of movement to bring it into precise alignment.

Referring particularly to Figs. 6 and 7, the member 30 which carries the box clamping jaws, is not fastened to carriage 28 but is movable with respect thereto. Specifically, it is carried by the slide 71 movable in a slot extending across the carriage at right-angles to its direction of movement. The spring 73 forces member 72 into frictional driving engagement with member 71, as most clearly shown in Fig. 7. Member 72, as shown in Fig. 6 is connected to or engaged by one end of an arm 74 which is pivoted upon carriage 28, the opposite end of the arm extending to the rear of the carriage and carrying a roller 75.

As the carriage approaches the box receiving station, the roller 75 engages the inclined surface 76 of a member 77, causing the arm 74 to return to the position shown in Fig. 4. The slide 72 is moved to the left, as viewed in Fig. 4, carrying the slide 71 along with it until the stop 78 of the latter engages the side of the carriage, whereupon the member 72 continues to its final position shown in Fig. 4.

With the slides in this position, the switch 44 is actuated to open the jaws 31, 32, permitting an operator to place a box, or box blank with a partially applied wrapper, upon the table 60 with the side wall of the box more remote from the form block against the fixed jaw 31. At the end of a fixed interval, during which this insertion has been made, the solenoid circuit is closed, closing the jaws upon the box. The operator in placing the assembly, need not take care to adjust the lower edge of the box as viewed in Figs. 3 and 4, in exact alignment with the corresponding edge of the form block or in any particular position. This edge, as shown in Fig. 4, may be a substantial distance from the edge of the stop 79, whose edge 80 is in precise alignment with the form block. Stop 79, as shown, is adjustable. It may be moved parallel to the path of carriage 28 by loosening screw 81, and adjusted at right-angles thereto for different lengths of box, by the hand wheel 82 having a shaft 83 which threadably engages the supporting block 84 for the stop.

While the carriage is still stationary at the box receiving station, the slide 85 which carries the member 77 is moved to the left as viewed in Fig. 4, and Fig. 9, by the arm 86, which is connected by link 87 to arm 68. The arm 74 rotates clockwise, moving the slide 72 to the right as viewed in Fig. 4, carrying along with it slide 71. The slides move as a unit until the edge e of the box B engages the edge 80 of the stop, automatically aligning it with the form block, whereupon the slide 71 stops, and the slide 72 continues to the limit of its movement.

The extent of the total movement for which the slides move together, depends upon how close the box was to proper alignment. The greater the misalignment of the box by the operator, the longer the travel of the slides together. The stroke afforded is sufficient to take care of substantial misalignment, for example, as much as a quarter of an inch or more. In the event that no box is in the machine, the slide 71 cannot move beyond the position determined by its stop 88.

When the carriage again approaches the box receiving station, with the slides displaced because of the prior aligning action, the counter-clockwise movement of arm 74, as above described, returns the parts to their proper position; specifically, the slides 71 and 72 move together until the stop 78 of the latter engages the side of the carriage, whereupon the slide 72 continues on alone. In other words, the sliding support 71 for the box clamp jaw, is always returned to the same position to receive a box, even though for different cycles of operation it may and ordinarily does move to different extents from that position during the automatic aligning operation.

Since the operator need not take the time to accurately align the box with the form block, she is afforded a much longer time to register the box or box blank upon the wrapper, or otherwise to prepare the assembly for transfer by the carriage to the form-block.

As shown in Fig. 2, the slide C1 opposite slide C, preferably carries a member 89, which is not a positive stop, but prevents the inertia of the box blank from pulling it out of the jaws when the carriage is abruptly stopped at its delivering position shown in Fig. 2.

The mechanism previously described may be used for aligning and transferring a component adapted to form the bottom and sides of the box, and to which has been applied a wrapper. The box ends BE held against the ends of the form block by the clamping members 90 are preferably cut from strip and transferred thereto by transfer members 91, generally as described and claimed in my aforesaid applications.

The descending form block carrying the box end components BE engages the main component transported into its path by the aforesaid mechanism, and carries it downwardly between the slides C—C4 whose tools, in a known manner, complete the application of wrapper W, or equivalent, to attach the components permanently in box-forming position.

With continued use of the machine, due to wear in the guides for the form block operating plungers 92, 93, the form block may not always take its proper position at the top of its stroke, but may be angularly displaced to greater or less extent. To insure proper position of the form block for reception of the box end components, even though wear has taken place, there are preferably provided the two arms 94 carrying rollers 95 at their outer ends. As the form block moves upwardly to position to receive the box end components from their transfer members 91, it is brought into exactly the proper position by the spaced arms 94.

In the modified box transfer structure shown in Figs. 11 to 15, the box, box blank, or assembly is held by suction, instead of by mechanical clamping members such as jaws 31, 32 of the prior modification. Specifically, the forward end of the carriage 28a terminates in a portion 96, which receives a slide 72a, carrying the relatively slidable, box-holding member 71a. With these parts in the position shown in Fig. 13, a box or box blank is brought into position to bring its rear wall against the holding member 71a. Suction applied through the port 97 of the carriage, passage 98 of member 72a, and opening 99 of member 71a, holds the box in place. However, a port 100 in member 72a may by-pass some of the suction.

As in the prior modification, the slide 85 is actuated, to effect clockwise rotation of the arm 74a. The slide 72a moves downwardly as viewed in Figs. 13 to 15, carrying with it the slide 71a due to friction between these parts. This movement continues until the edge e of the box component engages the edge 80 of the stop for automatic alignment, whereupon the member 71a is arrested, the member 72a continuing until it engages the stop 101 attached to or associated with the slide 28. Member 101 may also serve the purpose of closing the port 100 so that full suction is applied to the box during its transfer from the aligned position of Fig. 15 to the form block.

When the carriage returns to the box receiving position, arm 74a is rotated in counter-clockwise direction by engagement with member 71a. The slides 71a and 72a retain their relative displaced positions shown in Fig. 15, until the pin 102 of slide 71a engages stop 101, whereupon the slide 72a continues, the parts finally assuming the box-receiving position shown in Fig. 13 which is always the same.

The suction for holding the box may be provided by the pump 62, i. e., the suction pipe 103 may connect to the intake of the pump, and the pipe 64 furnishing the air blast, may connect to the outlet of the same pump.

As with the preceding modification, the operator need only place the boxes in positions of approximate alignment with the form block, and the mechanism will automatically move the box through the proper distance to effect precise alignment.

Figure 16:
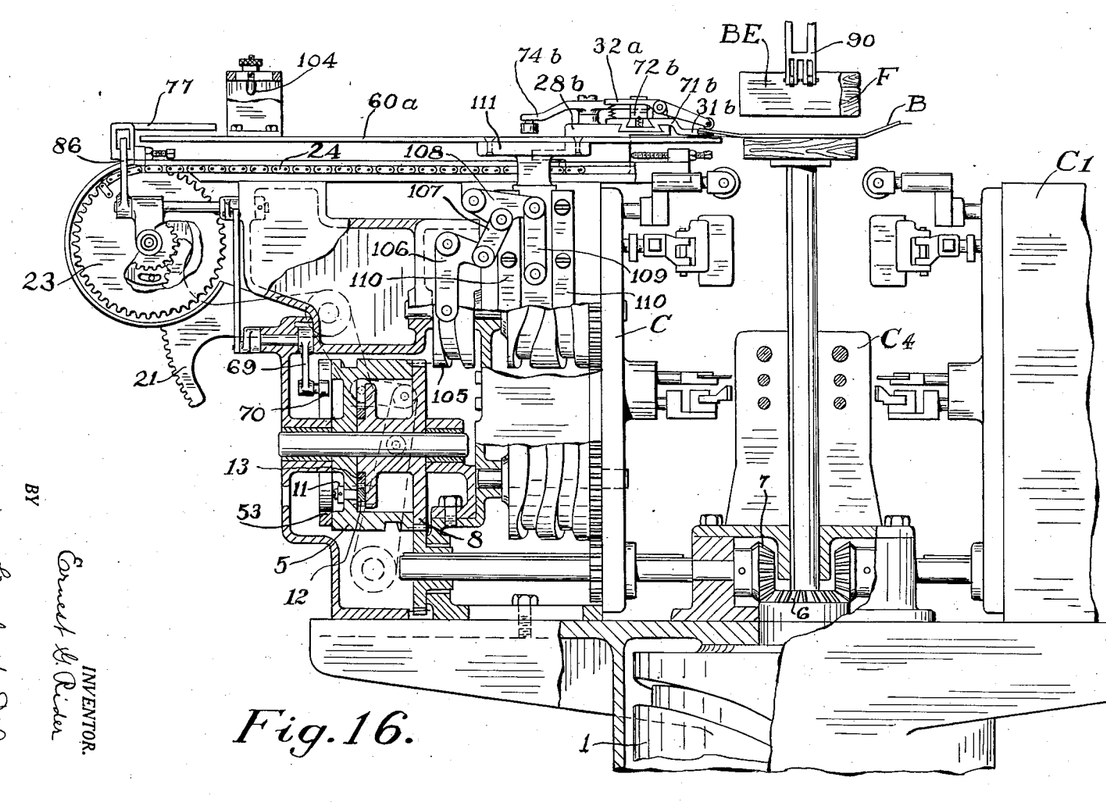
Fig. 16 is generally similar to Fig. 2, illustrating, however, a modified form of transfer mechanism.

The modification of my invention shown in Fig. 16 is similar to that of my prior application, Serial No. 460,859, filed June 13, 1930, in that the table 60a is raised and lowered, the pin 104 depressing the tail end of the movable box clamping jaw 32a at the box-receiving position. The motion of the table is derived from a cam 105 through a series of links 106—109, the members 110 guiding the support 111 of the table for vertical reciprocating movement.

The automatic alignment of the box blank, unstayed box, or the like, is effected generally, as in the preceding modifications. Specifically, the structure 71b actually carrying the clamping members is slidably mounted upon the carriage 28b, and is frictionally engaged by a second slide 72b associated with an operating arm 74b. At the box receiving station, the movement of arm 74b in response to actuation of slide 85 effects automatic alignment of the box, and movement of the arm by engagement with member 77 effects return of members 72b and 71b to their original position for each return of the carriage to box receiving position. Cam 105 is so timed that the clamping members are separated at the receiving station to receive a box, and closed to clamp the box before the arm 74 is actuated to effect automatic alignment.

While I have illustrated several preferred modifications, it is to be understood my invention is not limited thereto but is of the scope defined by the appended claims.

What I claim is:

1. In a box-forming system, structure for holding a box, a stop, mechanism for moving said structure in one direction to bring the box against said stop, and means for moving thereafter said structure in another direction for transporting the box along a path determined by the position of said stop.

2. In a box-forming system, structure for loosely holding a box, a stop, mechanism for moving said structure to bring said box against said stop and thereby to effect relative movement of said box and said holding structure, and means for thereafter moving said structure in another direction to transport the box while held in the position determined by said stop.

3. In a box-forming system, a reciprocating carriage, structure carried thereby for loosely holding a box, a stop, and means adjacent a limit of movement of said carriage operable to effect movement of said structure with respect to said carriage to effect engagement of said box with said stop.

4. In a box-forming system, a reciprocating carriage, structure carried thereby for loosely holding a box, a stop adjacent the path of said carriage, and means operable while said carriage is at rest to move said structure with respect to carriage in a direction transversely of the carriage movement to effect engagement of said box with said stop.

5. In a box-forming system, a carriage movable toward and away from a box-receiving position, box-holding structure carried thereby movable in one direction with respect thereto as said carriage approaches said position, a stop, and means operable to effect reverse movement of said structure to bring a box held thereby against said stop.

6. In a box-forming system having a form-block, a carriage movable between said form block and a box-receiving station, box-holding structure mounted on said carriage for movement relative thereto, a stop and means at said station for moving said structure in one direction as the carriage approaches, and for moving said structure in a reverse direction to bring the box against said stop in alignment with the form block before movement of said carriage toward said form block.

7. In a box-forming system having a form-block, structure for transporting an assembly comprising a box and partially applied sheet material toward said form block, and means providing an air-cushion to support the unapplied sheet material during transport of the assembly by said structure.

8. In a box-forming system having a form block, structure for transporting an assembly comprising a box and partially applied sheet material toward said form block, means providing an air-cushion to support the unapplied sheet material during transport of the assembly by said structure, and mechanism for disabling said means when said structure is in position to receive said assembly for transport.

9. In a box-forming system having a form block, structure for holding an assembly comprising a box and partially applied sheet material, mechanism for moving said structure in one direction to effect alignment of the box with said form block, mechanism for moving said structure in another direction to transport the aligned assembly toward said form block, means for providing an air-cushion to support the unapplied sheet material during transport of the assembly, and mechanism for disabling said means during the box-aligning movement of said structure.

10. In a box-forming system, box-transporting mechanism including relatively movable clamping members for engaging a box, means for effecting relative movement of said members comprising an electromagnet, and circuit-controlling means for said electromagnet operated in timed relation to movement of said mechanism.

11. In a box-forming system, a reciprocating carriage for transporting a box, relatively movable clamping members carried thereby, an electromagnet and circuit-controlling means carried by said carriage, and mechanism disposed adjacent a limit of travel of said carriage for actuating said circuit controlling means to effect separation of said clamping members.

12. In a box-forming system, a reciprocating carriage for transporting an assembly comprising a box and partially applied sheet material, and members carried by said carriage for supporting unapplied sheet material projecting from said box during transport of the assembly.

13. In a box-forming system, a box-transporting mechanism comprising a carriage, a support carried thereby, box-clamping members adjustable along said support to accommodate boxes of different dimensions, an operating arm for said clamping members, and actuating structure for said arm comprising a member in continuous sliding engagement therewith for all positions of adjustment of said members along said support.

14. In a box-forming system, a carriage, box-holding means carried thereby including separable clamping members, mechanism for controlling said members, mechanism for effecting relative movement of said box-holding means and said carriage to align the box, and timing means for controlling said mechanisms to effect opening of said members to receive a box and to effect operation of said second mechanism after said members have closed to hold a box.

15. In a box-forming system, a carriage, relatively movable structure carried thereby including box-holding means, and mechanism at a box-receiving station for operating said means to receive a box, and for effecting movement of said structure to align the box.

16. In a box-forming system, a carriage, relatively movable structure carried thereby including separable box clamping members, means for controlling said members including an electromagnet and circuit-controlling means therefor, a stop adjacent the path of said carriage, mechanism operative when said carriage is at a box-receiving station to move said structure away from said stop and subsequently to return said structure toward said stop to align a box therewith, and mechanism actuating said circuit-controlling means to effect separation of said members to receive a box and to close said members before return movement of said structure.

17. In a box-forming system, structure for holding a box, a stop, a member frictionally engaging said structure, and means for moving said member to effect movement of said structure until the box engages said stop whereupon said member slides along said structure.

18. In a box-forming system having a form block, a carriage, structure carried thereby for receiving a box in a position of rough alignment with and holding it in said position, a member frictionally engaging said structure, and means for moving said member to effect movement of said structure until said box is precisely in alignment with the form block by engagement with said stop whereupon said member slides along said structure.

19. In a box-forming system having a form block, a carriage, structure carried thereby for receiving a box in a position of rough alignment with and holding it in said position, a member frictionally engaging said structure, means for moving said member to effect movement of said structure until said box is precisely in alignment with the form block by engagement with said stop whereupon said member slides along said structure, and means operative upon return of said carriage to actuate said member to return said structure to a predetermined position.

20. In a box-forming system, structure for holding a box by suction, a stop, a member frictionally engaging said structure and transmitting suction thereto, and means for moving said member to effect movement of said structure until the box engages said stop whereupon said member continues to move without effecting movement of said structure but continues to furnish suction.

21. In a box-forming system, structure for holding a box by suction, a stop, a member frictionally engaging said structure and transmitting suction thereto, a port in said member for by-passing part of the suction, and means for moving said member with said port open to effect movement of said structure until the box engages said stop whereupon said member continues to move, the port closing to increase the suction on the box.

22. In a box-forming system having a form-block, a carriage, structure carried thereby for holding a box by suction, a stop, a member frictionally engaging said member and transmitting suction thereto, a port in said member for by-passing part of the suction, means for moving said member to effect movement of said structure until the box is aligned with the form block by said stop whereupon the member continues to move, and means operative to move said carriage toward the form block after said port has closed to increase the suction of the aligned box.

23. In a box-forming system, a reciprocating carriage, structure carried thereby and movable with respect thereto, box clamping members carried by said structure, mechanism for actuating said members to receive a box, a stop, means operative subsequently to said mechanism for moving said structure to bring the box against said stop, and means thereafter operative to effect movement of said carriage.

24. In a box-forming machine having a form block, a carriage for receiving boxes and delivering them to said form block, and means operating in timed relation to said carriage for aligning the boxes while received thereby with the form block.

25. In a box-forming machine having form block structure, mechanism for delivering box-end components to ends of said form block structure, and means engaging a side of said form block when in end-receiving position to prevent angular displacement thereof.

26. In a box machine having a form block, reciprocating structure for transporting assemblies each comprising unstayed box structure and a partially applied wrapper to said form block, and mechanism operating while said structure is at rest at the receiving end of its stroke to align the assemblies while engaged by said reciprocating structure.

27. In a box machine having a form block, reciprocating means for transporting box structures to said form block including a suction head for holding a box wall, and mechanism operating while said means is at rest at the receiving position to align the box structure prior to its transport to said form block.

28. In a box forming system having a form block and adjustable slides carrying sheet-applying tools, reciprocating structure for holding a box for movement to said form block from one side thereof, and stop structure carried by the opposite of said slides for engaging the box whereby adjustment of the slides for different sizes of boxes effects concurrent adjustment of said stop structure.

29. In a box-forming system having a form block, structure for holding a box, mechanism for moving said structure toward and from said block to transport boxes thereto from a box receiving station, and mechanism including structure adapted to move to and fro transversely of the direction of movement of a box by said first structure for aligning the box prior to its transport from said station by said first structure.

30. In a box-forming system having a form block, means for transporting assemblies, each comprising a box blank and partially applied sheet material, to said form block from a receiving station, comprising structure for holding a panel of a blank at the receiving station, mechanism for effecting reciprocation of said structure toward and from said form block, and mechanism including structure movable to and fro transversely of the direction of transport of the assemblies for aligning them at the receiving station prior to their transport by said first structure toward the form block.

31. In a box-forming system having a form block, means for transporting assemblies, each comprising a box-blank and partially applied sheet material, to said form block from a receiving station, comprising structure for engaging and holding erect the rear panel of a blank at said station, mechanism for effecting reciprocation of said structure toward and from said form block, and mechanism including a member swinging transversely of the direction of transport of the assemblies for aligning them at the receiving station prior to their transport by said first structure toward the form block.

32. In a box-forming system having a form block, structure for loosely gripping one side of an unstayed box blank, mechanism for moving said structure to bring said unstayed box to a predetermined position in the path of said form block from one side thereof, and structure on the other side of the path of said form block to prevent the inertia of said unstayed box blank from causing it to travel beyond alignment with said form block when said structure is arrested, said form block in its movement disengaging the box blank from said structure.

33. A system for applying sheets to boxes comprising a member for supporting a sheet to be applied to a box, reciprocating transfer structure effective in one direction of its movement to push a sheet along said supporting member to a registered position, and means for applying air between the sheet and supporting member to apply a sustaining force to said sheet during its transport by said reciprocating transfer structure.

ERNEST G. RIDER.